Dec. 2, 1941.  N. J. SMITH  2,264,485
INSTRUMENT MOUNTING
Filed March 16, 1939
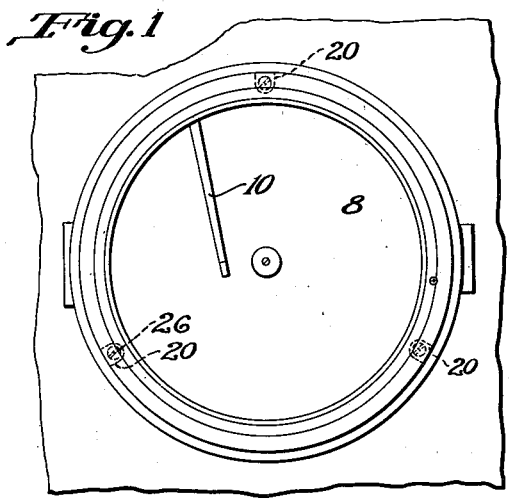
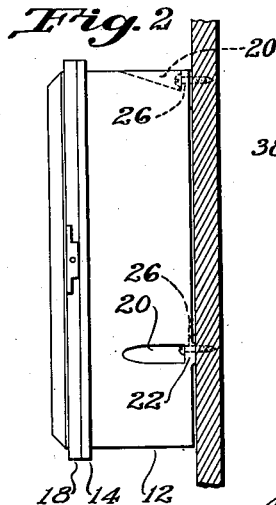
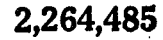
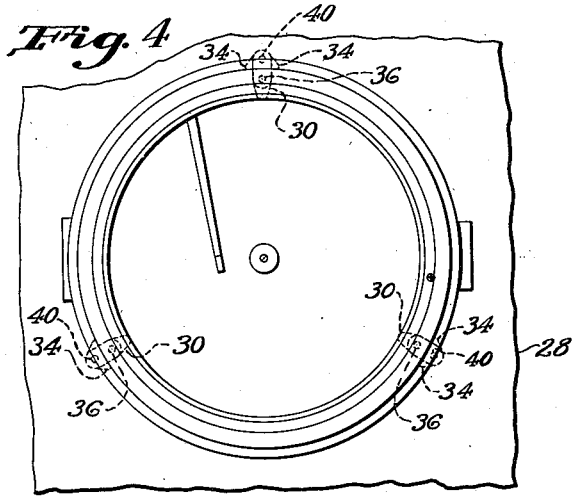
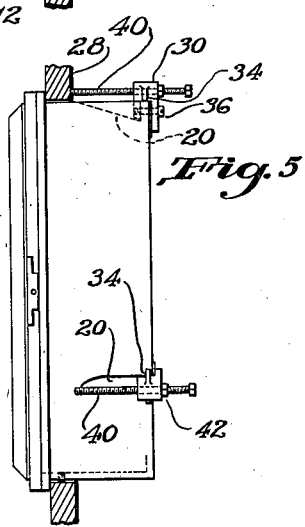
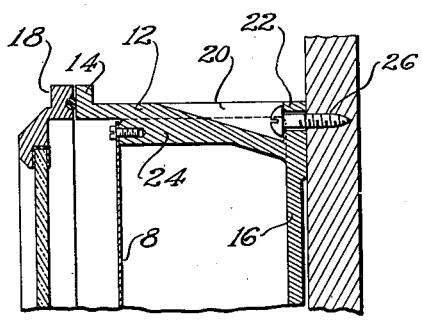
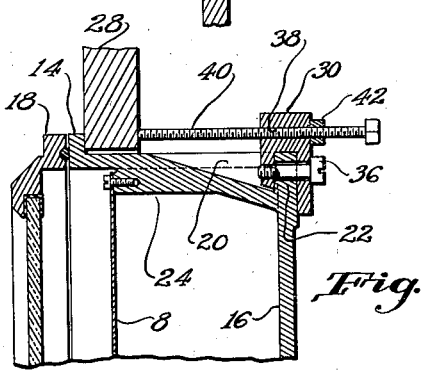

Patented Dec. 2, 1941

2,264,485

UNITED STATES PATENT OFFICE 2,264,485

INSTRUMENT MOUNTING

Norman J. Smith, Medfield, Mass., assignor to Crosby Steam Gage & Valve Company, Boston, Mass., a corporation of Massachusetts Application March 16, 1939, Serial No. 262,201

1 Claim. (Cl. 248—27)

The present invention relates to instrument mountings and has for its object to provide an instrument case adapted for either wall or flush mounting, and presenting an attractive appearance in either case. With this object in view, the present invention comprises the instrument case and mounting means therefor hereinafter described and particularly defined in the claim.

In the accompanying drawing Fig. 1 is a front elevation of a recording instrument embodying the features of the present invention and applied to a wall mounting; Fig. 2 is a side elevation of the instrument shown in Fig. 1; Fig. 3 is a detail sectional view corresponding to Fig. 2; Figs. 4, 5 and 6 are views corresponding to Figs. 1, 2 and 3, respectively, but showing a flush mounting for the instrument; and Fig. 7 is a detail of a bracket used for the flush mounting.

The invention is applicable to instruments of any type such as gauges, meters, etc., but in the drawing is illustrated as a recorder having a chart plate 8 and pen arm 10. The instrument comprises a cast body portion 12 having a front flange 14 and a rear face plate 16. The body portion proper is of substantially uniform external dimensions and in the cylindrical form herein shown is of uniform external diameter. A door or face member 18 may be hinged or otherwise attached to the flange 14.

The body is cast with a plurality of inwardly sloping recesses 20 as shown in Figs. 3 and 6. The back plate 16 being of uniform diameter, therefore, forms a web 22 at the base of each recess. The inner wall of the recess which necessarily protrudes into the interior of the body is extended forwardly to form a post 24 on which the dial or chart plate 8 is mounted. Since means for mounting plate 8 must be provided, the inwardly protruding wall of the recess entails no substantial wastage of space which might be required for the instrument assembly.

When the instrument case is to be mounted directly on a wall, it is attached to the wall simply by screws 26 passed through holes in the webs 22. The slope of the recesses 20 is sufficient to permit convenient attachment of the instrument in this manner.

For flush mounting of the instrument, the whole instrument body is inserted into an opening in a panel 28, the opening being only slightly larger than the external dimensions of the instrument case. The front flange 14 abuts against the panel. There is then attached to each web an outboard bracket 30 which is preferably of the type shown in perspective in Fig. 7. The bracket is slotted at 32 to embrace the web, and immediately above the slot is provided with tongues 34 to engage with the peripheral edge of the body, and thus to prevent displacement of the bracket with respect thereto. The bracket is provided with holes registering with the hole in the web, whereby the bracket may be securely attached to the web by means of a bolt 36. The outer portion of the bracket is provided with a tapped hole 38 to accommodate a long bolt 40, which is turned until it bears at its end against the rear face of the panel 28, as shown in Figs. 5 and 6, a check nut 42 serving to maintain the bolt securely in position. When the several bolts 40 are tightened up, the instrument is locked securely in place with the flange 14 abutting firmly against the front face of the panel.

The recesses 20 may be of any desired number, but, as shown in the drawing, three have been found sufficient for either the wall or the flush mounting. This construction avoids the necessity for unsightly rear flanges or ears commonly used for wall mountings, and also provides an instrument case universally adaptable for either type of mounting.

In the drawing, the case is illustrated as being cylindrical in shape in common with present constructions of meters, gauges, recorders, etc., but the invention is not limited to any particular shape of case, so long as the external dimensions are substantially uniform.

Having thus described the invention, I claim:

An instrument case comprising a body portion having a plurality of insert attaching webs at the back thereof substantially confined within the external dimensions of the housing, a front flange extending outwardly beyond the body portion to provide a seat in a flush mounted installation, outboard attaching brackets connected to the webs, and positioning bolts threadedly mounted in the outboard brackets designed to engage with the rear surface of a supporting panel against which the front flange is seated.

NORMAN J. SMITH.